Feb. 3, 1970   C. R. VAN NIEL   3,493,918
PANEL-MOUNTED ELECTRICAL TERMINAL CLIP
Filed Feb. 16, 1968   2 Sheets-Sheet 1

INVENTOR.
CLARENCE R. VAN NIEL
BY
Teare, Teare & Sammon
ATTORNEYS

Feb. 3, 1970   C. R. VAN NIEL   3,493,918
PANEL-MOUNTED ELECTRICAL TERMINAL CLIP
Filed Feb. 16, 1968   2 Sheets-Sheet 2

INVENTOR.
CLARENCE R. VAN NIEL
BY
Teare, Teare & Sammon
ATTORNEYS 3,493,918
PANEL-MOUNTED ELECTRICAL
TERMINAL CLIP
Clarence R. Van Niel, North Olmsted, Ohio, assignor to
Tinnerman Products, Inc., Cleveland, Ohio, a corporation of Ohio
Filed Feb. 16, 1968, Ser. No. 706,125
Int. Cl. H02b 1/02
U.S. Cl. 339—128                        18 Claims

ABSTRACT OF THE DISCLOSURE

An electrical connector assembly including a fastener device for insertion in an apertured support member, and an electrical clip device for insertion into the fastener device to provide terminal connections on opposed sides of the support member. The fastener device includes a shank-like body having a head and a pair of spaced, resilient legs and a tubular member disposed between the legs for receiving a stud in threading engagement for securement of the clip device to the fastener device. The legs include lengthwise extending recesses to receive portions of the clip device in insulating relation in the assembled position thereof.

BACKGROUND OF THE INVENTION

The present invention relates to fastening devices, and more particularly relates to an electrical connector assembly for use in providing electrical terminal connections on opposed sides of a support member, such as in the connection of antenna wires to a television chassis or the like.

Heretofore, it has been known to provide various anchor fasteners of the type to receive a threaded member, such as a screw, for mounting in an apertured support panel. Such prior devices have been made of plastic and have generally included a flexible or bifurcated shank for receiving a screw to expand the shank for securement within the aperture in the panel. In many cases, the shanks of the prior devices are too flexible so that only partial threads are formed, thereby reducing its holding power. In other cases, the construction has been too rigid, thereby reducing the holding power of the fastener with respect to the aperture in the panel. Furthermore, such prior devices have not been satisfactory for providing electrical connections on opposed sides of a support panel, particularly such as would be employed in connecting antenna wires to a metal television chassis. In such installations, it is important that the fastening assembly incorporate optimum holding power within the panel opening and with respect to the stud or screw to achieve a tight, positive securement of the electrical leads with the chassis to prevent accidental detachment and/or to reduce interference with reception and hence, distortion of the electrical signal. Furthermore, it is important that the assembly incorporate optimum insulating characteristics for use in such electrical installations. Additionally, the fastener assembly should be susceptible to use with a relatively wide range of panel thickness as well as tolerance variations to accommodate a variety of applications.

Typical of the prior art devices include those to G. M. Rapata 2,788,047 and 2,836,214.

SUMMARY OF THE INVENTION

A fastening device for insertion in an apertured support member comprising, a shank-like body adapted for insertion through the aperture in said support member, the body including a pair of spaced, resilient legs extending from a head portion, a tubular member disposed in laterally spaced relation between said legs and connected thereto adjacent the end remote from said head and adapted to receive a stud therethrough in threaded engagement therein, the legs each including lengthwise extending recesses adapted to receive terminal portions of an electrical clip device. The clip device comprising an apertured base adapted to receive said stud and at least one resilient leg-like terminal extending from said base and adapted to be inserted and held within one of the recesses in said fastener device to provide a terminal connection on the side of said support member remote from said base.

By the foregoing arrangement, there is provided a novel electrical connector assembly which is of a rugged, yet simple and economic construction, for readily and efficiently connecting and providing an electrically insulated connection between electrical equipment, such as a television chassis, and one or more conductor elements, such as antenna wires or the like.

BRIEF DESCRIPTION OF THE DRAWINGS

FIG. 4a is a front elevation view, partly in section, showing the connector clip device mounting a stud in accordance with the invention;

DESCRIPTION OF THE PREFERRED EMBODIMENTS

Figure 1:
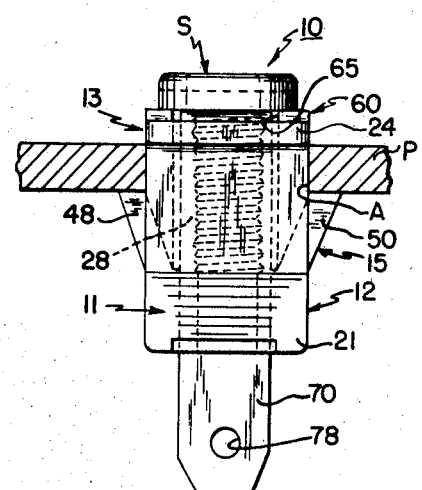
FIG. 1 is a side elevation view of the electrical connector assembly of the invention.
Figure 2:
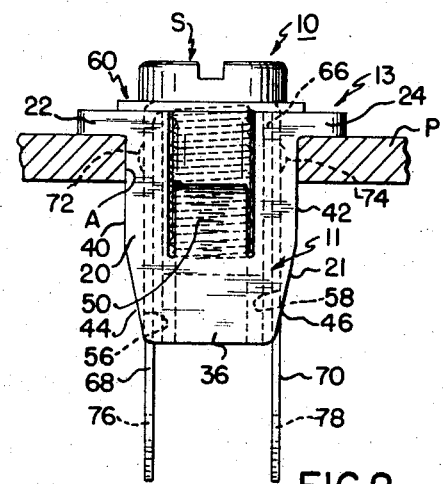
FIG. 2 is a front elevation view of the connector assembly of FIG. 1.

In general, the electrical connector assembly device of the invention is designated generally at 10, FIGS. 1 and 2. As shown, the assembly comprises, in one form, a fastener device 12 and an electrical conductor clip device 14 adapted for mounting engagement with the fastener device. The fastener device 12 preferably includes a split-body having a shank portion 11 adapted to be inserted through an opening A in a support member P, such as a panel or the like. The body of the fastener further includes a head portion 13 and a retention means, designated generally at 15, which coacts in engaged relation with the opposed sides of the support member P so as to lock the fastener device in secured relation within the opening therein. A tubular member 28 is disposed within the body of the fastener device 12 for receiving a connector element S in threading relation therein.

The electrical conductor clip device 14 includes a base 60 having at least one depending leg-like terminal, such as 68 or 70, for mounting insertion in the fastener device 12 and an aperture 65 extending through the base for receiving the connector element S for securement of the clip device on the fastener device, thereby to provide electrical terminal connections on one and/or both sides of the support member P.

In the invention, the fastener device 12 is made from a good electrical insulating material. Preferably, the device is made from a polymeric material, such as polycarbonate. Such material which may be used is available under the trademark designation Lexan. Accordingly, the device may be readily produced as a unitary, one-piece construction by conventional molding techniques, as known in the art.

Figure 4:
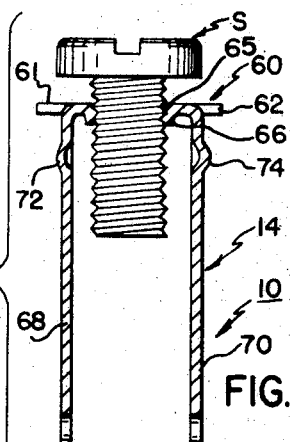
FIG. 4 is a front elevation assembly view, partly in section, of the connector assembly of FIG. 1.
Figure 4B:
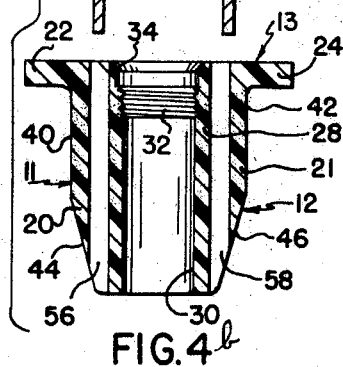
FIG. 4b is a front elevation view, in section, of the fastener device of the invention.
Figure 5:
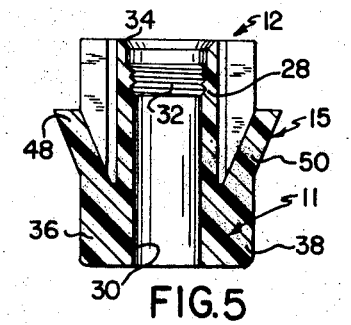
FIG. 5 is a side elevation view, in section, of the fastener device of FIG. 4b.

As best seen in FIGS. 2, 4b and 5, the body 11 of the fastener device 12 includes a pair of laterally spaced, oppositely disposed resilient legs 20 and 21 which extend generally parallel to one another. Each leg is provided adjacent its free end with an outwardly extending flange, such as 22 and 24, which together define a head portion 13 for supporting the fastener when inserted through the opening A in the support member P.

In accordance with the invention, an elongated, tubular member 28 is disposed in predetermined laterally spaced relation between the legs 20 and 21. The tubular member 28 is preferably of a cylindrical construction having a length substantially coextensive with that of the legs 20 and 21 and has an axially extending bore 30 for receing a connector element S, such as a stud, screw or the like, therein. The bore 30 may have a smooth or unthreaded interior surface for self-threading engagement with the connector element, such as a screw. As shown in FIG. 4b, the upper end of the bore 30 may be partially threaded, as at 32, to facilitate initial turning movement of the screw into the bore. In addition, the upper marginal edge of the bore 30 may be tapered or chamfered, as at 34, to facilitate rotary turning movement of the screw into the bore and/or to provide a seat-pilot for the connector clip device 14, as will hereinafter be more fully described. Accordingly, the internal diameter of the unthreaded portion of the bore 30 is preferably less than the diameter of the screw to achieve a self-threading action therein.

The legs 20 and 21 opposite their free ends are preferably integrally connected to the adjacent confronting surface of the tubular member 28 by web portions 36 and 38 which extend transversely and generally at right angles to the legs, as best seen in FIGS. 2 and 5. By this arrangement, the legs 20 and 21 are free for resilient pivotal movement toward and away from the tubular member 28 about the web portions which act as fulcrum connections for the legs. As best seen in FIG. 2, the legs 20 and 21 each include generally vertically extending planar surface portions 40 and 42 and convergently inclined planar surface portions 44 and 46 to facilitate insertion of the body 11 through the opening in the support member P. Moreover, the legs 20 and 21 at the planar portions 40 and 42 define a polygonal, such as rectangular or square, configuration in transverse cross section for insertion into a polygonal opening in the support member P. Thus, due to the resiliency of the legs, the shank-like body of the fastener may be inserted through openings having relatively close tolerances.

To achieve further securement of the fastener device 12 within the opening of the support member P, a pair of oppositely disposed resilient wings 48 and 50 may be made integral with and extend upwardly and outwardly from the respective web portions 36 and 38 on opposed sides of the tubular member 28. The wings 48 and 50 terminate at their free ends generally intermediate the length of the legs 20 and 21 and are adapted for snap-fastening coacting engagement with the confronting under side of the support member P in the installed position of the device.

In the invention, the fastener device has particular application in mounting an electrical clip device, such as 14. To this end, each of the legs 20 and 21 is formed with a lengthwise extending channel or recess, such as 56 and 58, disposed on opposed sides of the tubular member 28. The recesses 56 and 58 are preferably of a polygonal, such as rectangular, shape in transverse cross section. In the form shown, the recesses 56 and 58 are coextensive in length with that of the legs 20 and 21 and the tubular member 28 and have a width W approximately equal to the maximum transverse dimension of the tubular member 28. Preferably, the outer peripheral surface of the tubular member 28 may extend slightly into the confines of the recesses which may, in the form shown, be of a generally U-shaped configuration which open outwardly in a direction toward the tubular member. By this arrangement, the recesses 56 and 58 coact with the tubular member 28 to provide a snug, yet resilient sliding fit for reception of the terminal portions of the electrical clip device 14, as will be described hereinafter.

Figure 3:
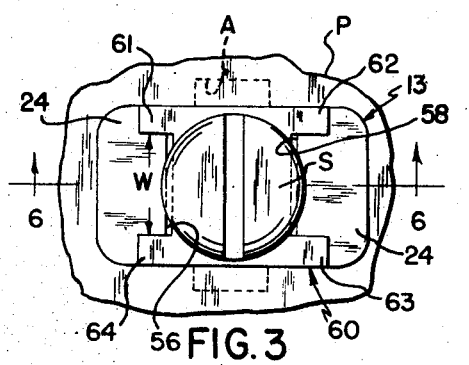
FIG. 3 is a fragmentary, top plan view of the connector assembly of FIGS. 1 and 2.

In the form shown, the clip device 14 is preferably made from a metallic material, such as steel or the like, and comprises a generally flat base 60 having a generally H-shaped configuration (FIG. 3) defined by a series of outwardly projecting tabs 61 to 64 which provide a support for the clip in the installed position with the fastener device 12. The base 60 is provided with a central aperture 65 which has a circular shape and which is defined by an annular downwardly curved flange 66 which coacts with and provides a threading pilot-like entry construction for the screw S. In addition, the flange acts as a guide for seating engagement with the chamfered portion 34 of the tubular member 28 so as to insure proper axial alignment of the aperture 65 with the bore 30 in the tubular member 28.

As best seen in FIGS. 1 and 4a, a pair of spaced, oppositely disposed resilient legs 68 and 70 extend downwardly from the base 60 in generally parallel relationship to one another. As shown, the legs 68 and 70 are preferably coextensive in length with one another and have an over-all length which is substantially greater than the length of the fastener device 12. The legs 68 and 70 are spaced apart and have a width sufficient to be slidably inserted within the recesses 56 and 58 provided in the fastener device 12.

To provide for additional securement of the clip device 14, each leg 68 and 70 is preferably provided with a dimple or embossment 72 and 74 formed from the material thereof and disposed below the base 60 which act to engage the confronting surfaces defined by the recesses 56 and 58 in the legs 20 and 21 of the fastener device 12. Furthermore, the embossments act to bias the legs 20 and 21 in an outward direction and into locking engagement with the marginal edges of the opening A in the support member P.

Figure 6:
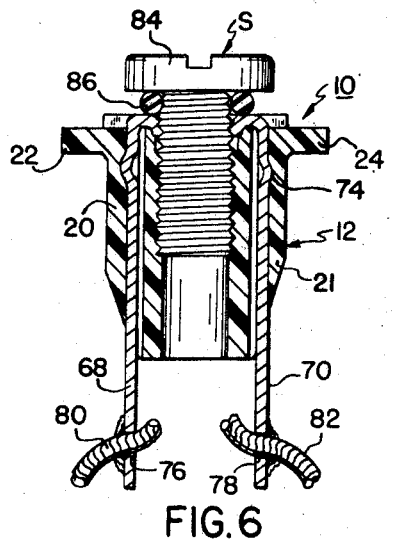
FIG. 6 is a cross-sectional view taken along the line 6—6 of FIG. 3.

As best seen in FIGS. 1 and 6, the legs 68 and 70 are each provided adjacent their lower ends with an aperture 76 and 78 to which may be attached the lead ends, as at 80 and 82, of an electrical component, such as a television chassis. Moreover, the screw S has a head end construction, as at 84, so as to provide a terminal post with another lead, as at 86, for connecting a conductor wire, such as an antenna wire. By this arrangement, there is provided a terminal connection on opposed sides of the support member via the clip device 14 which connections are electrically insulated from the metallic chassis via the fastener device 12.

Figure 7:
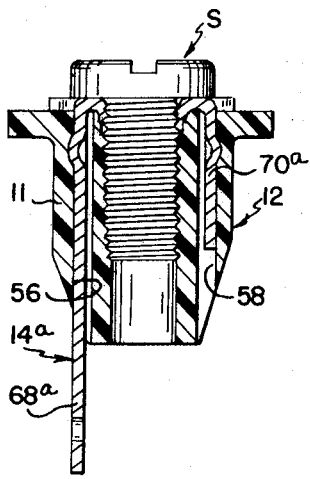
FIG. 7 is a view corresponding to FIG. 6, but showing another embodiment of the electrical clip device of the invention.

In FIG. 7, there is illustrated another alternate form of the conductor clip device 14a wherein one of the legs, such as 70a, is foreshortened with respect to the other leg 68a. In this form, the length of the leg 70a is less than the length of the corresponding recess, such as 56 or 58, so that only one terminal connection is provided by the other leg 68a which extends outwardly from the body 11 of the fastener device 12. This arrangement is useful in applications where only one terminal connection is necessary to complete the electrical installation.

Figure 8:
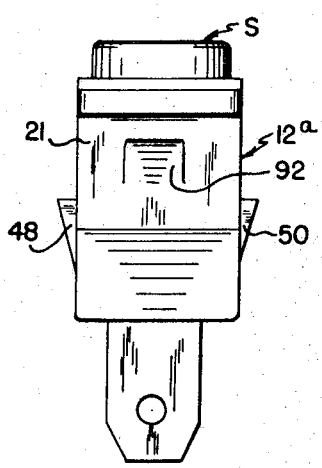
FIG. 8 is a side elevation view of another embodiment of the connector assembly of the invention.
Figure 9:
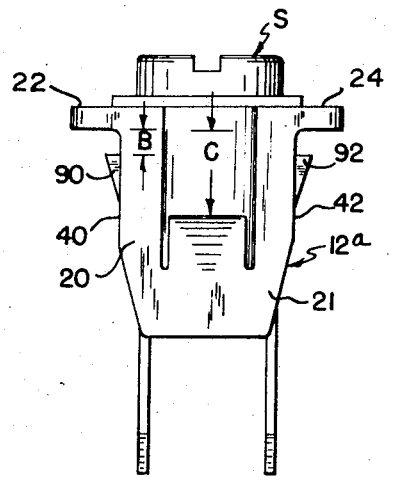
FIG. 9 is a front elevation view of the connector assembly of FIG. 8.

In FIGS. 8 and 9, there is illustrated a modified form of the fastener device 12a which is generally identical to that described in connection with FIGS. 1 to 7, except that a second pair of wings, such as 90 and 92, which are of a generally rigid construction are formed from the material of the legs 20 and 21. In this form, the wings 90 and 92 extend upwardly and outwardly from the planar portions 40 and 42 of the legs 20 and 21 and hence, at right angles to the wings 48 and 50. However, the wings 90 and 92 are preferably made integral with the material of the legs 20 and 21 throughout their length with the free ends of the other pair of wings 48 and 50 terminating substantially adjacent the point of commencement of the upper pair of wings 90 and 92. As best seen in FIG. 9, the transverse distance B between the flanges 22 and 24 of the fastener device 12a and the upper extremities of the wings 90 and 92 is less than the corresponding distance C with respect to the lower pair of wings 48 and 50. By this arrangement, the construction of the fastener device is such that it may be employed with a relatively wide range of panel thickness, as desired.

In a typical installation of the assembly device 10, the body 11 of the device may be inserted through the opening A in the support member P until the flange 22 and 44 engage the confronting upper side of the support member. During such movement, the wings 48 and 50 first bias inwardly and then snap back in an outward direction for engagement with the confronting underside of the support member. Thus installed, the electrical clip device 14 may then be mounted by inserting the terminal legs 68 and 70 into and through the recesses 56 and 58 until the base 60 with the tabs 61 to 64 engages the confronting surface of the flanges 22 and 24. During this movement, the embossments 72 and 74 on the legs 68 and 70 act to bias the fastener legs 20 and 21 outwardly into further secured engagement with the marginal edge of the opening A in the support member. In this position, the annular flange 66 of the clip device is brought into registered alignment with the bore 30 in the tubular member 28, whereupon, the screw S may then be inserted through the opening 65 in the base 60 for threading engagement into the bore 30 in the tubular member 28. Prior to final seating of the screw, the electrical lead 66 (FIG. 6) may be attached below the head end 84 of the screw S so as to be drawn into tight electrical contact with the base 60 of the clip device 14 upon final seating of the screw. The other leads, such as 80 and 82, may then be attached to the terminal legs 68 and 70 via the apertures 76 and 78, as aforesaid.

In another form, the installation may be accomplished by a partially assembled arrangement so as to handle a fewer number of parts. In such case, the electrical clip device 14 may be held in a partially inserted position in the body 11 of the polymeric fastener via the screw S which is also partially inserted into the bore 30 of the tubular member 28.

The screw S may be partially inserted into the tubular member 28 by a number of methods, such as for example: (1) by partially threading the screw into the bore 30, (2) by thermal softening of the end of the tubular member 28 and then applying a force on the head of the screw to force the same into the bore 30, and (3) by inserting the screw into the bore 30 by an ultra sonic process.

In such case, installation of the fastener assembly device 10 to the panel P may be accomplished in the same manner as aforementioned by inserting the body 11 of the polymeric fastener through the opening A in the panel until it is fully seated, whereupon, the electrical clip device 14 is then fully inserted into and through the recesses 56 and 58 until the base 60 engages the confronting surfaces of the flanges 22 and 24 and finally, the screw S is turned for threading engagement into the bore 30 of the tubular member 28, as aforesaid.

The terms and expressions which have been used, are used as terms of description and not of limitation, and there is no intention in the use of such terms and expressions of excluding any equivalents of any of the features shown or described, or portions thereof, but it is recognized that various modifications are possible within the scope of the invention disclosed.

I claim:
1. A fastener device and an electrical component for mounting with an apertured support member, the combination comprising,
 a shank-like body adapted to be inserted through the aperture in said support member,
 said body including a pair of spaced, oppositely disposed resilient legs,
 a tubular member disposed in spaced relation between said legs and adapted to receive a connector element in threading engagement therein,
 said legs being attached at one end to said tubular member and at the other end being adapted for pivotal movement toward and away from said tubular member,
 each of said legs including a recess portion extending throughout its length thereof,
 said recess portions being disposed on opposed sides of said tubular member adapted for receiving the terminal portions of an electrical component therein, and
 an electrical component mounted on said fastener device,
 said component comprising an electrical connector clip having an apertured base adapted to receive said connector element therethrough, and
 at least one leg having a terminal portion at one end extending downwardly from said base for insertion through one of the recess portions in the respective legs of said fastener device to provide a terminal connection.

2. A fastener device in accordance with claim 1, wherein the leg of said clip has a greater lengthwise dimension than the legs of said fastener device so as to project below said shank-like body.

3. A fastener device in accordance with claim 2, wherein the leg of said clip includes an outwardly extending protrusion disposed adjacent and below said base adapted for coacting engagement with the confronting interior surface of the recess portion in the respective leg of said fastener device to bias the clip leg into engagement with the confronting surface of said tubular member.

4. A fastener device in accordance with claim 2, wherein
 said tubular member includes an axially extending bore for receiving a threaded member in self-threading engagement therein,
 the aperture in the base of said clip being disposed in axial alignment with the bore in said tubular member for receiving the threaded member inserted into said bore, and
 said aperture defined by an annular pilot-like flange depending downwardly toward the bore in said tubular member.

5. A clip device in accordance with claim 1, wherein said base is of a generally H-shaped configuration in top plan defined by two pair of laterally spaced tab portions projecting outwardly from opposed sides of said base.

6. A clip device in accordance with claim 5, wherein said tab portions project outwardly from the sides of said base adjacent the juncture with said at least one of said legs.

7. A clip device in accordance with claim 1, wherein one of a plurality of said legs has a greater lengthwise dimension as compared to the other of said legs, and
 said longer leg having an aperture disposed adjacent its free end adapted to provide a terminal connection for an electrical component.

8. A clip device in accordance with claim 1, wherein one of a plurality of said legs includes an outwardly extending protrusion disposed adjacent said base and below said base a sufficient distance.

9. A clip device in accordance with claim 1, wherein the aperture in the base of said clip is defined by an annular pilot-like flange depending downwardly toward said fastener.

10. A one-piece fastening device adapted for mounting an electrical component or the like on an apertured support member comprising, a split-body having a shank portion adapted for insertion through an aperture in a support member, said shank portion including a pair of laterally spaced, oppositely disposed resilient legs, an elongated tubular member disposed lengthwise between and spaced inwardly of said legs adapted to receive a connector element in threading engagement therein, said legs being integrally attached at one end adjacent one end of said tubular member and being free of attachment througout their length in a direction toward their opposite ends with respect to said tubular member and adapted for pivotal movement toward and away from said tubular member about their attached ends thereof, each of said legs including a laterally outwardly extending flange portion adjacent its free end to define a head adapted for engagement with one side of said support member, each of said legs including a lengthwise extending recess portion opening inwardly in a direction toward said tubular member, and said recess portions being substantially coextensive in length with said tubular member so as to open onto opposed ends of said body adapted to receive the terminal portions of an electrical component therethrough so as to provide an insulated terminal connection on the other side of said support member in the installed position thereof.

11. A fastening device in accordance with claim 10, wherein said body is made from a polymeric material having a polygonal shape in transverse cross-section.

12. A fastening device in accordance with claim 11, wherein said tubular member is made from a polymeric material having a cylindrical configuration and a length substantially coextensive with that of said legs.

13. A fastening device in accordance with claim 12, wherein said tubular member includes an axially extending bore having an unthreaded interior surface over a major portion of its length and having a reduced transverse dimension as compared to said connector element for self-threading engagement with said element when turned through said bore.

14. A fastening device in accordance with claim 10, including transversely extending web portions integrally connecting respective ends of said legs to said tubular member, a pair of resilient wing-like members made integral with said web portions on opposed sides of said tubular member, said wing-like members disposed transversely of said legs and extending upwardly and outwardly in a direction away from the respective web portions adapted to be biased inwardly upon insertion of said device through the aperture in said support member and for engagement with the other side of said support member in installed position thereof.

15. A fastening device in accordance with claim 14, including another pair of wing-like members made integral with said legs above said first mentioned pair of wing-like members, said other pair of wing-like members being integrally attached substantially throughout their length to the respective legs and disposed generally at right angles with respect to said first mentioned pair of wing-like members and extending upwardly and outwardly from the respective legs.

16. A fastening device in accordance with claim 10, wherein the said recess portions are of a polygonal configuration in transverse cross-section, and the maximum transverse dimension of said tubular member being approximately equal to the widthwise dimension of said recess portions.

17. A fastening device in accordance with claim 10, wherein said legs extend generally parallel to one another and to said tubular member, and said recess portions extending linearly and generally parallel with respect to said tubular member.

18. A fastening device in accordance with claim 16, wherein the maximum transverse distance between the outermost surfaces of said recess portions is greater than the maximum transverse dimension of said tubular member, and said tubular member being centrally disposed between said legs so that the confronting peripheral portions thereof extend into the confines of the respective legs of said recess portions.

References Cited

UNITED STATES PATENTS

| | | | |
|---|---|---|---|
| 2,399,957 | 5/1946 | Tinnerman | 339—263 X |
| 3,354,422 | 11/1967 | Duris | 339—275 X |
| 2,742,636 | 4/1956 | Alden | 339—128 X |
| 2,836,215 | 5/1958 | Rapata | 85—80 |
| 2,860,233 | 11/1958 | Johnson | 240—7.1 |
| 3,079,581 | 2/1963 | Klumpp | 339—128 |
| 3,217,319 | 11/1965 | Rueger | 339—126 X |
| 3,241,097 | 3/1966 | Ege | 339—214 X |
| 3,340,497 | 9/1967 | Balint | 339—128 X |
| 3,358,551 | 12/1967 | Seckerson | 85—80 |

RICHARD E. MOORE, Primary Examiner

U.S. Cl. X.R.

339—214